July 21, 1925. 1,547,147

K. E. PEILER

APPARATUS FOR SEPARATING MOLTEN GLASS INTO MOLD CHARGES

Original Filed March 25, 1922 2 Sheets-Sheet 1

INVENTOR
KARL E PEILER

ATTORNEY

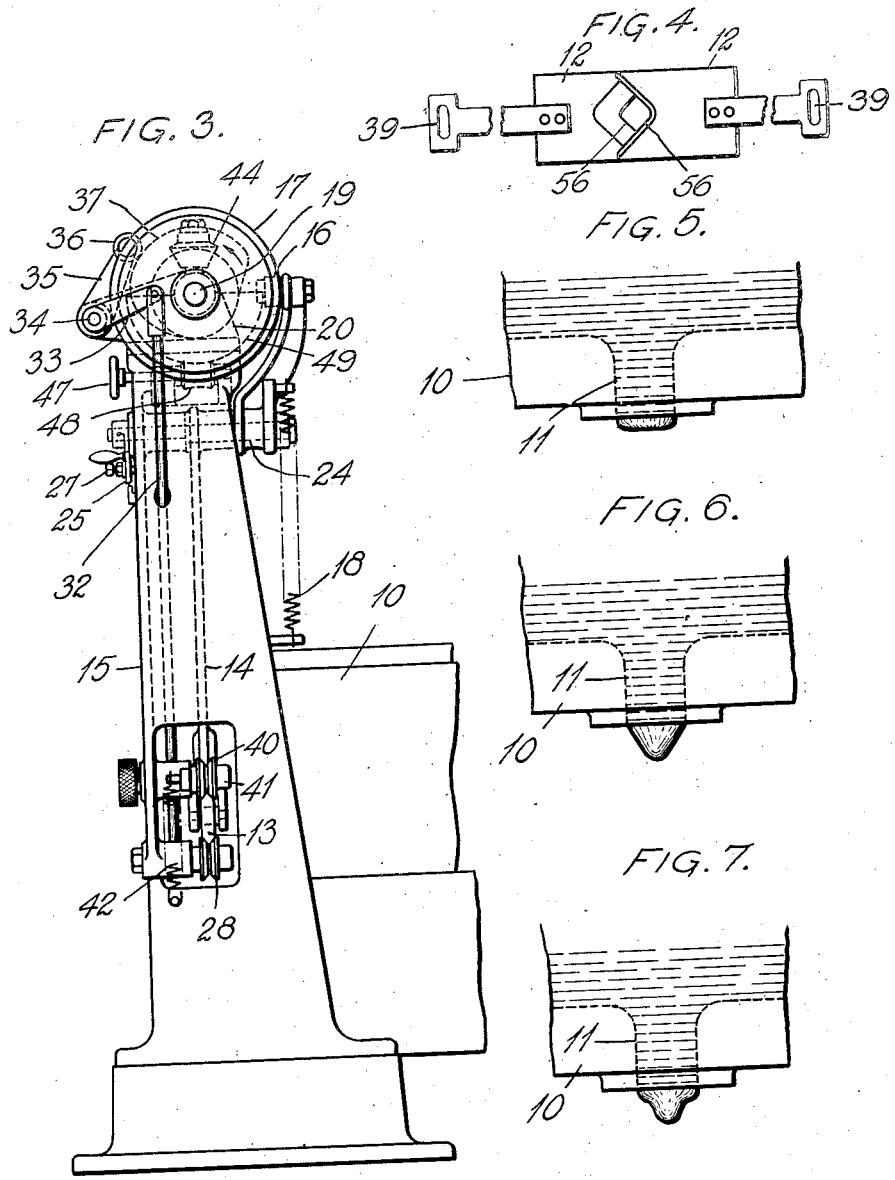

Patented July 21, 1925.

1,547,147

UNITED STATES PATENT OFFICE.

KARL E. PEILER, OF WEST HARTFORD, CONNECTICUT, ASSIGNOR TO HARTFORD-FAIRMONT COMPANY, OF CANAJOHARIE, NEW YORK, A CORPORATION OF NEW YORK.

APPARATUS FOR SEPARATING MOLTEN GLASS INTO MOLD CHARGES.

Application filed March 25, 1922, Serial No. 546,551. Renewed February 27, 1925.

*To all whom it may concern:*

Be it known that I, KARL E. PEILER, a citizen of the United States, residing at West Hartford, in the county of Hartford and State of Connecticut, have invented new and useful Improvements in Apparatus for Separating Molten Glass into Mold Charges, of which the following is a specification.

This invention relates to apparatus for separating molten glass into mold charges, by the means of one or more shear blades having a movement resoluble into a component at right angles to the path of the glass and a component parallel to the path of the glass; that is, the shearing movements are oblique, in part at least, with respect to the line of movement of the glass.

The object of the invention is to provide apparatus of the character described, capable of controlling and varying the shape of the end of the mold charge. This is accomplished by providing means operable during the operation of machine to vary the relative time of occurrence of the components of movement of the severing means, and means for adjusting the speed or duration of the severing operation. By these means, the shape of the mold charges, particularly the lower ends, may be varied in accordance with the characteristics of the molds in which they are to be received.

The various features of the invention employed for the accomplishment of these objects and such others as may hereinafter appear, will best be understood from the following description and accompanying drawings of a preferred embodiment of the invention, in which:

Fig. 3 is an end elevation of the apparatus shown in Fig. 1, looking from the right;

Fig. 4 is a detailed view on an enlarged scale, showing, in plan, a form of serving blades which may be used;

Figs. 5, 6 and 7 are detailed views showing various shapes which may be produced by various adjustments of the apparatus; and Fig. 8 is a detail view of an adjustable cam which may be used to control the dropping movement of the shears.

Figure 1:
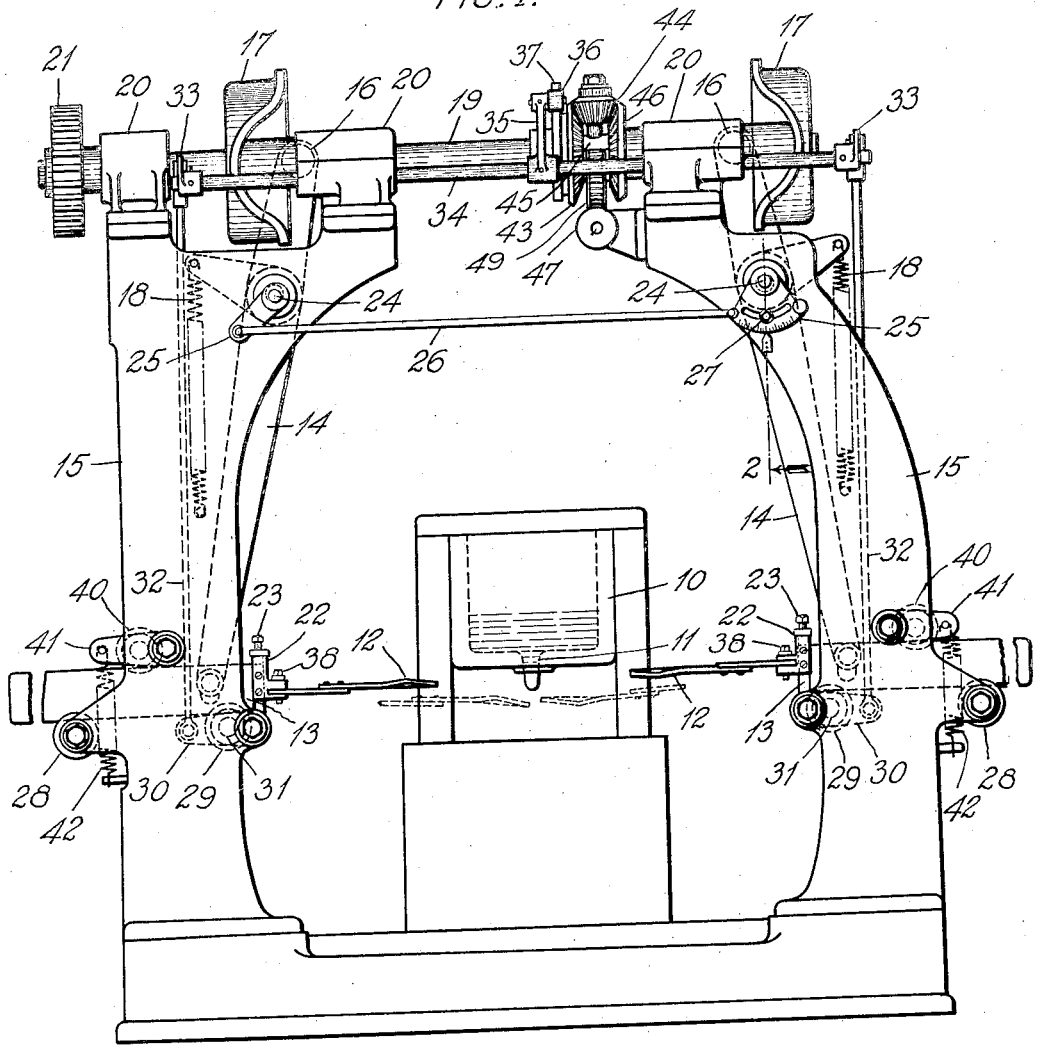
Figure 1 is a front elevation of the apparatus, including a portion of a container for the molten glass.

The present invention is herein illustrated and described as incorporated in a machine of the general type shown in U. S. Patent No. 1,379,594, in which glass severing shears are shown having oblique movements, to minimize the contact between the glass and the shears to avoid chilling the glass and heating the shear blades.

In this invention, a molten glass container 10, which may be a projection or forehearth formed on the usual glass furnace is provided with a submerged outlet 11, through which glass is discharged either by the action of gravity alone or by the aid of a plunger or any of the known devices for controlling the discharge of glass.

The severing means comprises a pair of blades 12 mounted on the end of slides 13 which are supported for movement toward and from each other by a plurality of antifriction rolls. The blades 12 are caused to move toward and from each other to sever the glass by levers 14 pivotally mounted on standards 15 and carrying at their upper ends rolls 16 which are held in engagement with cams 17 by springs 18. These shear actuating cams are rigidly mounted on a shaft 19, rotatable in bearings 20 fixed on the top of the standards 15. One end of the shaft is provided with a gear 21 which may be connected with any suitable source of power. By this construction the rotation of the shaft 19 causes the blades 12 to approach to sever the glass and to recede.

The lower ends of the mold charges may be varied in shape by changing the position, time, and rate of movement of the shears during the severing period. The shear actuating levers are pivotally mounted upon eccentric studs 24. By turning these studs to move the eccentric pivots toward or from each other, the shear blades are set nearer to or farther from each other, thus changing the time at which the shear blades reach the glass. The change in time brings a different portion of the contour of the cams 17 into contact with the rolls 16 at the time of cutting, and by forming the cams with a suitably varying rise as distinguished from a uniform rise, the speed of the shears at the time of severing, may be varied. The studs are connected for equal turning movement, by arms 25 (Figs. 1 and 2) and a link 26, one of the arms being provided with a setting index and suitable clamping means as shown at 27. When connected as shown, the eccentric portions of one stud should be set upwardly, and the other downwardly. Or the link 26 should be connected above one stud and below the other stud.

The blades are moved up and down during their reciprocations by tilting the slides 13 by means of grooved anti-friction rolls which support and guide the slides. One pivotal roll 28 below each slide is mounted in fixed position on the standards 15 and rolls 29 below the slide are arranged to be moved vertically so as to cause the tilting movement. Each roll 29 is arranged for vertical movement by mounting it on an arm 30 pivotally mounted at 31 on its standard and having its movable end connected with a rod 32 pivotally connected with an arm 33 mounted on a rock shaft 34. This rock shaft is carried in projections formed on the bearings 20, and it is oscillated at appropriate intervals by an arm 35 carrying a roll 36 in engagement with a cam 37 mounted on and driven by the shaft 19 carrying the shear cams 17.

The slide 13 is provided with a third anti-friction roll 40 which yieldingly engages the upper edge of the slide, and holds it in engagement with both the pivot roll 28 and the movable roll 29. The roll 40 is mounted on an arm 41 pivotally mounted on the standard 15 and having its free end held yieldingly downward to cause the roll to embrace the slide, by a spring 42. By this construction, when the roll 29 is lowered by the action of the cam 37, the roll 40 follows up the movement of the slide and keeps it firmly seated on the two lower rolls, rocking the slide upon the pivot roll 28.

In order that the relative time of operation of the shear cams 17 and the drop cam 37 may be adjusted and varied during the operation of the machine, the cam 37 is driven through an adjustable driving connection. The cam 37 is attached to a bevel gear 43 loosely mounted on the shaft 19. This gear is in mesh with a pinion 44, loosely mounted on a collar 45, carried by the shaft 19, and driven by a bevel gear 46 fixed on the shaft 19. The relation between the driving gear 46 and the driven gear 43, and consequently between the drop cam 37 and the shear cams 17, is adjusted by varying the angular position of the collar 45 on the shaft 19 by means of a hand wheel 47 which actuates a worm 48 (Fig. 3) in mesh with a segmental gear 49 formed integral with the collar 45. By turning the hand wheel 47 to the right or left, the drop cam 37 is advanced or retarded relative to the shear cams 17, correspondingly advancing or retarding the time of dropping the shear blades.

These adjustments of the pivots 24 and the drop cam 37 may be made at any time, without stopping the machine, so that effects of the adjustments may be observed while making them, and without interrupting production.

The speed and duration of the dropping movement of the shears is determined by the contour of the cam 37 and in order that these factors may be varied conveniently, a cam having one or more removable and adjustable lobes may be employed, as illustrated in Fig. 8 where the shaft 19 carries a keyed collar 53 on which a cam lobe 54 is adjustably secured by screws 55 through slots in the cam lobe. By this construction the cam lobe may readily adjusted, or removed and another lobe substituted, to impart a greater or less drop to the shears or to change the speed or rate of drop.

Figure 2:
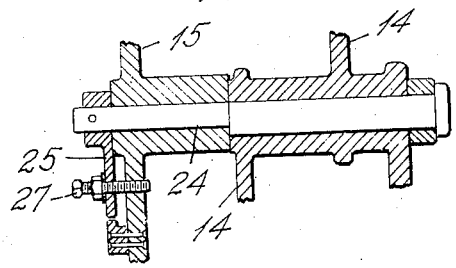
Fig. 2 is a vertical section on the line 2—2 of Fig. 1.

The blades 12 are preferably adjustably mounted on the slides 13 for vertical adjustment, so as to vary the height of the shear blades relative to the outlet, and are preferably also adjustable sidewise so as to adjust the shears sidewise in the desired relation to the outlet. Such an arrangement is shown in Fig. 1 by the vertically sliding blocks 22, adjusted vertically by screws 23. The shear blades are clamped in these blocks by screws 38 passing through slotted openings 39 (Fig. 4), in the shanks of the shear blades. More elaborate devices for thus mounting and adjusting the shear blades vertically and horizontally are shown and described and claimed in my earlier applications, one of these being shown in the drawings of my Patent No. 1,405,936 of Feb. 7, 1922. The shear blades may be thus adjusted in either direction during intermissions in their movements, while they are resting in their retracted positions, and without stopping the machine.

The preferred form of the blades is shown in Fig. 4 in which they are provided with cooperating V shaped notches 56, which act to constrict the glass on four sides while severing it.

Fig. 5 shows the form of stub produced by a horizontal movement only of the shear blades during the severing operation. In this case the dropping movement of the blades may occur after the completion of the severing operation, so as to remove the blades at once from engagement with the stub to minimize heating the blades and chilling the glass.

Fig. 6 shows a form of stub in which the vertical and horizontal movements of the blades occur simultaneously during engagement with the glass, thereby producing a resultant diagonal movement and forming a conical stub with rounded end.

In Fig. 7 the severing of the glass begins with a horizontal movement only, the vertical component being then introduced, thereby producing a stub having a shoulder as illustrated. Various other shapes may be produced by proper timing of the dropping movement of the shears combined with the effect of the different speeds of severing. It is believed that the operation of the machine will be clearly apparent from the foregoing description.

It is to be understood that the particular embodiment of the invention illustrated and described has been selected by way of example only, and that the construction and arrangement of parts may be changed and modified without departing from the spirit of the invention as defined by the following claims.

I claim:—

1. Apparatus for separating molten glass into mold charges, including glass severing means, means for moving the severing means in a direction which is the resultant of two components, one component being parallel with the direction of movement of the glass and the other component being transverse thereto, and means for varying the relative time of occurrence of these component movements during the operation of the apparatus.

2. Apparatus for separating molten glass into mold charges including a molten glass container having an outlet through which the glass is discharged, glass severing means, means for moving the severing means in a direction substantially parallel with the direction of discharge of the glass, means for moving the severing means in a direction transverse to the line of discharge, and means for adjusting the relative times of occurrence of these movements during the operation of the apparatus.

3. In a machine having shear blades for separating charges of molten glass, the combination of mechanism for reciprocating the shear blades, means operating in timed relation with the reciprocating means for tilting the shear blades during the reciprocation and means for adjusting the relative times of occurrence of the reciprocating and the tilting movements.

4. In apparatus for obtaining mold charges of molten glass, the combination with a flow outlet adapted to deliver the molten glass, of severing means mounted for movement parallel with and also across the path through which the glass is delivered, separate means for effecting said movements, and means for adjusting the relative times of occurrence of said movements during the continuous operation of the machine.

5. In apparatus for obtaining mold charges of molten glass, the combination with a flow outlet adapted to deliver the molten glass, of severing means, means for moving the severing means diagonally across the line of discharge of the glass, and means for varying the vertical component of such movement independently of any variation in the horizontal component during the operation of the apparatus.

6. In apparatus for separating molten glass into mold charges, the combination of a molten glass container having a discharge outlet, a pair of glass severing blades mounted for reciprocation to sever glass delivered from the outlet, a cam operatively connected with the shear blades to move them vertically, a cam to reciprocate the blades and means for adjusting the timed relation of the cams during the operation of the machine.

7. In machines having shear blades for separating charges of molten glass, the combination of mechanism for reciprocating each blade horizontally, a rock shaft, connections between the rock shaft and the shear blades for moving them vertically, and means for adjusting the relative time of occurrence of the said horizontal and the vertical movements of the shear blades.

8. In apparatus for separating molten glass into mold charges, the combination of shears to sever the glass, means for changing the plane of the shears during each severing operation, and means for adjusting the severing speed of the shears.

9. In apparatus for separating molten glass into mold charges, the combination of a container having an outlet for the discharge of the glass, shears adapted to sever the glass beneath the outlet, means for dropping the shears during the severing operation, and means for adjusting the duration of the severing period.

10. In apparatus for separating molten glass into mold charges, the combination of shears, means for actuating the shears to sever the glass, means for adjusting the duration of the severing operation, means for lowering the shears during the severing operation, and means for adjusting the time of occurrence of the lowering movement.

11. In apparatus for separating molten glass into mold charges, the combination of shears, a cam to impart a severing movement to the shears, a cam to lower the shears, and means for effecting independent adjustment of the time of operation of each cam.

Signed at Hartford, Connecticut, this 24th day of March, 1922.

KARL E. PEILER.